United States Patent
Walls

(10) Patent No.: US 11,650,059 B2
(45) Date of Patent: May 16, 2023

(54) SYSTEMS AND METHODS FOR LOCALIZING A VEHICLE USING AN ACCURACY SPECIFICATION

(71) Applicant: Toyota Research Institute, Inc., Los Altos, CA (US)

(72) Inventor: Jeffrey M. Walls, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 888 days.

(21) Appl. No.: 16/001,511

(22) Filed: Jun. 6, 2018

(65) Prior Publication Data
US 2019/0376797 A1   Dec. 12, 2019

(51) Int. Cl.
| G01C 21/32 | (2006.01) |
|---|---|
| G01C 21/36 | (2006.01) |
| G06K 9/00 | (2022.01) |
| G06K 9/66 | (2006.01) |
| B60W 30/18 | (2012.01) |
| G08G 1/0967 | (2006.01) |
| G01C 21/00 | (2006.01) |

(52) U.S. Cl.
CPC ......... G01C 21/32 (2013.01); G01C 21/3602 (2013.01); G01C 21/3848 (2020.08)

(58) Field of Classification Search
None
See application file for complete search history.

(56) References Cited

U.S. PATENT DOCUMENTS

| 8,111,917 B2 | 2/2012 | Vogt et al. |
| 9,129,161 B2 * | 9/2015 | Agosta ............... G06K 9/00791 |
| 9,612,123 B1 | 4/2017 | Levinson et al. |
| 9,739,620 B2 | 8/2017 | Duan et al. |
| 9,863,775 B2 | 1/2018 | Kojo |

(Continued)

FOREIGN PATENT DOCUMENTS

| EP | 0317181 B1 | 1/1994 |
| WO | 2011160672 A1 | 12/2011 |

OTHER PUBLICATIONS

Kuien Liu, Yaguang Li, Fengcheng He, Jiajie Xu, Zhiming Ding, "Effective map-matching o the most simplified road network," https://dl.acm.org/citation.cfm?id=2424429&dl=ACM&coll=DL; Published/Accessed: Nov. 6, 2012.

*Primary Examiner* — Adam D Tissot
*Assistant Examiner* — Laura E Linhardt
(74) *Attorney, Agent, or Firm* — Dinsmore & Shohl LLP

(57) ABSTRACT

A system for localizing a vehicle in an environment having a computing device comprising a processor and a non-transitory computer readable memory, a first map data stored in the non-transitory computer readable memory, where the first map data defines features within an environment used to localize a vehicle within the environment, and a machine-readable instruction set. The machine-readable instruction set causes the computing device to: determine a portion of the first map data having a first type of road, determine a first accuracy specification for the first type of road, wherein the first accuracy specification identifies one or more features of the plurality of features defined in the first map data used to localize a vehicle traversing the first type of road within a predefined degree of accuracy, and create a second map data for the first type of road.

23 Claims, 7 Drawing Sheets

(56) References Cited

U.S. PATENT DOCUMENTS

| | | |
|---|---|---|
| 2008/0102857 A1 | 5/2008 | Kim |
| 2017/0008521 A1* | 1/2017 | Braunstein ............. G08G 1/167 |
| 2017/0277716 A1* | 9/2017 | Giurgiu ............... G06F 16/2365 |
| 2017/0285639 A1 | 10/2017 | Jones et al. |
| 2017/0366930 A1 | 12/2017 | Treman et al. |
| 2018/0246907 A1* | 8/2018 | Thiel ........................ G06F 16/29 |
| 2018/0335306 A1* | 11/2018 | Deng ....................... G01S 19/48 |
| 2019/0213451 A1* | 7/2019 | Schafer .................... G06N 3/08 |
| 2019/0332120 A1* | 10/2019 | Choi ........................ G01C 21/32 |
| 2021/0063169 A1* | 3/2021 | Abeling ............. G01C 21/3694 |

* cited by examiner

SYSTEMS AND METHODS FOR LOCALIZING A VEHICLE USING AN ACCURACY SPECIFICATION

TECHNICAL FIELD

The present specification generally relates to systems and methods of localizing a vehicle and, more specifically, systems and methods for localizing a vehicle in an environment using accuracy specifications.

BACKGROUND

Autonomous driving systems, from driver assistance systems such as lane keeping assistive systems to fully automated driving systems, utilize sensor inputs, map data, and other datasets for autonomously controlling a vehicle. To account for unpredictable and unknown variables that may occur during a driving event, the autonomous driving systems utilize large amounts of sensor input data, map data, and other datasets to formulate control plans. This results in a need for large amounts of computational resources, which increases the complexity and cost of an autonomous driving system. However, autonomous driving systems may be able to operate by processing only a subset of available data in some instances.

SUMMARY

In one embodiment, a system for localizing a vehicle in an environment includes a computing device comprising a processor and a non-transitory computer readable memory, a first map data stored in the non-transitory computer readable memory, where the first map data defines a plurality of features within an environment used to localize a vehicle within the environment, and a machine-readable instruction set stored in the non-transitory computer readable memory. The machine-readable instruction set stored causes the computing device to perform at least the following when executed by the processor: determine a portion of the first map data having a first type of road, determine a first accuracy specification for the first type of road, where the first accuracy specification identifies one or more features of the plurality of features defined in the first map data used to localize a vehicle traversing the first type of road within a predefined degree of accuracy, and create a second map data for the first type of road, where the second map data comprises the one or more features defined by the first accuracy specification, and the second map data includes fewer features to localize the vehicle than the first map data.

In another embodiment, a system for localizing a vehicle in an environment includes a computing device comprising a processor and a non-transitory computer readable memory, a first map data stored in the non-transitory computer readable memory, where the first map data comprises one or more features defined by a first accuracy specification for localizing a vehicle traversing a first type of road, a second map data stored in the non-transitory computer readable memory, where the second map data comprises one or more features defined by a second accuracy specification for localizing the vehicle traversing a second type of road, and the second type of road is different from the first type of road, and a machine-readable instruction set stored in the non-transitory computer readable memory. The machine-readable instruction set stored causes the computing device to perform at least the following when executed by the processor: determine whether the vehicle is deemed to be traversing the first type of road or the second type of road, localize the vehicle using the second map data when the vehicle is deemed to be traversing the first type of road, and localize the vehicle using the third map data when the vehicle is traversing the second type of road.

In yet another embodiment, a method of localizing a vehicle in an environment includes determining a portion of a first map data having a first type of road, determining a first accuracy specification for the first type of road, wherein the first accuracy specification identifies one or more features for localizing a vehicle traversing the first type of road, creating a second map data for the first type of road, wherein the second map data comprises the one or more features defined by the first accuracy specification, determining whether the vehicle is traversing the first type of road, and localizing the vehicle utilizing the second map data when the vehicle is deemed to be traversing the first type of road.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
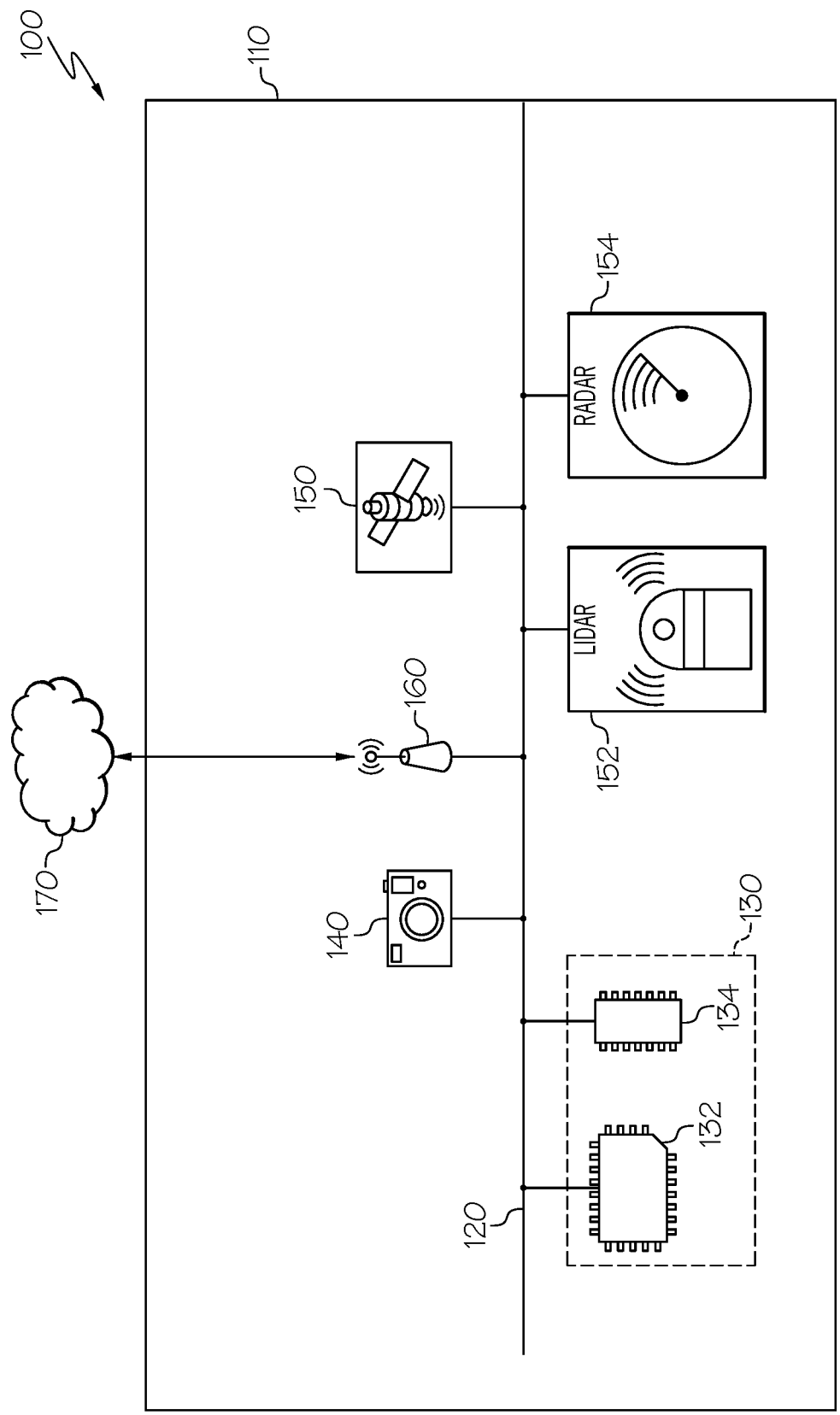
FIG. 1 schematically depicts a system for localizing a vehicle in an environment according to one or more embodiments shown and described herein.

The embodiments disclosed herein include systems and methods for localizing a vehicle in an environment using accuracy specifications. Localizing a vehicle in an environment is an important feature for many autonomous driving systems. In general, global positioning systems (GPS) are implemented to localize a vehicle. However, GPS can be error prone, for example in city environments, or lack the granularity required to provide precise vehicle control. To enhance localization of a vehicle, many autonomous driving systems, which may include systems from collision avoidance and driver assistance systems to a full autonomously controlled vehicle, utilize numerous sensors and numerous types of sensors positioned to sense features within an environment around the vehicle. The sensed features may be analyzed, categorized, and/or compared to known features from map data to provide a high level of accuracy and precision in localizing a vehicle in an environment. To achieve these high levels of accuracy and precision, complex and computationally intense systems may be needed. However, autonomous vehicles do not always require the same high level of accuracy and precision for localizing the vehicle in all environments. For example, when an autonomous vehicle is traveling along a highway there may be less of a need to precisely localize the vehicle's longitudinal progress, but there may be a need to accurately and precisely localize the vehicle's lateral activity, so that the vehicle does not depart from its lane of travel. As such, the systems and methods described and shown herein provide systems and methods that can better utilize and reduce consumption of the computational resources for localizing a vehicle by implementing accuracy specifications for vehicles that may be traversing specific types of road, performing specific driving actions, or the like. By better utilizing and reducing the consumption of computational resources for localizing a vehicle as defined in the accuracy specifications, system resources may be utilized for other tasks or even eliminated thereby reducing the cost and complexity of an autonomous driving system.

Referring generally to the figures, the systems and methods include one or more sensors including, for example, one or more cameras, a GPS system, a LIDAR system, and a RADAR system, that are coupled to a computing device having a processor, a non-transitory computer readable memory, and a machine-readable instruction set. In some embodiments, the machine-readable instruction set causes the processor to at least determine one or more types of roads within map data and determine an accuracy specification for one or more of the types of roads. Based on the accuracy specification, the portion of the map data for the type of road may be refined or a new map data may be created for the type of road whereby the number of features and/or sensor inputs required for localizing the vehicle traversing that type of road may be reduced. The systems and methods herein may then implement the new map data for localizing the vehicle when the vehicle traverses the particular type of road. As such, the system may transition between different map data stored in the non-transitory computer readable memory as the vehicle traverses different types of roads and/or performs various driving actions. The various systems and methods for localizing a vehicle in an environment using accuracy specifications will now be described in more detail herein with specific reference to the corresponding drawings.

Turning now to the drawings wherein like numbers refer to like structures, and particularly to FIG. 1, a system 100 for localizing a vehicle 110 is depicted. The system 100 generally includes a communication path 120, a computing device 130 comprising a processor 132 and a non-transitory computer readable memory 134, one or more cameras 140, a global positioning system (GPS) 150, a LIDAR system 152, a RADAR system 154, and network interface hardware 160. The vehicle 110 is communicatively coupled to a network 170 by way of the network interface hardware 160. The components of the system 100 may be contained within or mounted to the vehicle 110. The various components of the system 100 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the computing device 130 may be any device or combination of components comprising a processor 132 and non-transitory computer readable memory 134. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

Still referring to FIG. 1, one or more cameras 140 are coupled to the communication path 120 and communicatively coupled to the processor 132. The one or more cameras 140 may be any device having an array of sensing devices capable of detecting radiation in an ultraviolet wavelength band, a visible light wavelength band, and/or an infrared wavelength band. The one or more cameras 140 may have any resolution. The one or more cameras 140 may be an omni-directional camera, or a panoramic camera. In some embodiments, one or more optical components, such as a mirror, fish-eye lens, or any other type of lens may be optically coupled to each of the one or more cameras 140. In embodiments described herein, the one or more cameras 140 may capture image data of the environment external to the vehicle 110 and provide the image data to the computing device 130. The one or more cameras 140 may be positioned within or on the vehicle 110 to view the environment external to the vehicle 110. For example, without limitation, one or more cameras 140 may be positioned on the dashboard of the vehicle 110 to capture images of the surroundings in front of the vehicle 110 during operation. The position of the one or more cameras 140 is not limited to the dashboard of the vehicle 110. The one or more cameras 140 may be positioned anywhere on or within the vehicle 110 to capture images of the surroundings of the vehicle 110 during operation.

In operation, the one or more cameras 140 capture image data and transmit the image data to the computing device 130. The image data may be received by the processor 132, which may process the image data using one or more image processing algorithms. Any known or yet-to-be developed video and image processing algorithms may be applied to the image data in order to identify an item or determine a location of an item relative to other items in an environment. Example video and image processing algorithms include, but are not limited to, kernel-based tracking (mean-shift tracking) and contour processing algorithms. In general, video and image processing algorithms may detect objects and movement from sequential or individual frames of image data. One or more object recognition algorithms may be applied to the image data to estimate three-dimensional objects to determine their relative locations to each other. For example, structure from motion, which is a photogrammetric range imaging technique for estimating three-dimensional structures from image sequences, may be used. Additionally, any known or yet-to-be-developed object recognition algorithms may be used to extract the objects, edges, dots, bright spots, dark spots or even optical characters and/or image fragments from the image data. For example, object recognition algorithms may include, but are not limited to, scale-invariant feature transform ("SIFT"), speeded up robust features ("SURF"), and edge-detection algorithms.

Still referring to FIG. 1, a global positioning system, GPS system 150, is coupled to the communication path 120 and communicatively coupled to the computing device 130. The GPS system 150 is capable of generating location information indicative of a location of the vehicle 110 by receiving one or more GPS signals from one or more GPS satellites. The GPS signal communicated to the computing device 130 via the communication path 120 may include location information comprising a National Marine Electronics Association (NMEA) message, a latitude and longitude data set, a street address, a name of a known location based on a location database, or the like. Additionally, the GPS system 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

In some embodiments, the system 100 may include a light detection and range (LIDAR) system 152. The LIDAR system 152 is communicatively coupled to the communication path 120 and the computing device 130. The LIDAR system 152 uses pulsed laser light to measure distances from the LIDAR system 152 to objects that reflect the pulsed laser light. A LIDAR system 152 may be made as solid-state devices with few or no moving parts, including those configured as optical phased array devices where its prism-like operation permits a wide field-of-view without the weight and size complexities associated with a traditional rotating LIDAR system 152. The LIDAR system 152 is particularly suited to measuring time-of-flight, which in turn can be correlated to distance measurements with objects that are within a field-of-view of the LIDAR system 152. By calculating the difference in return time of the various wavelengths of the pulsed laser light emitted by the LIDAR system 152, a digital 3-D representation (e.g., a point cloud representation) of a target or environment may be generated. The pulsed laser light emitted by the LIDAR system 152 may in one form be operated in or near the infrared range of the electromagnetic spectrum, with one example having emitted radiation of about 905 nanometers. Sensors such as the LIDAR system 152 can be used by vehicle 110 to provide detailed 3D spatial information for the identification of objects near the vehicle 110, as well as the use of such information in the service of systems for vehicular mapping, navigation and autonomous operations, especially when used in conjunction with geo-referencing devices such as the GPS system 150 or a gyroscope-based inertial navigation unit (INU, not shown) or related dead-reckoning system, as well as non-transitory computer readable memory 134 (either its own or memory of the computing device 130).

In some embodiments, the one or more sensors of the system 100 may include a RADAR system 154. The RADAR system 154 is communicatively coupled to the communication path 120 and the computing device 130. A RADAR system is a system which employs a method of using radio waves to determine the range, angle, and relative velocity of objects. The RADAR system 154 may be used in conjunction with one or more cameras 140, ultrasound, the LIDAR system 152 or other sensors to obtain information about a vehicle's surroundings. Processing data from the RADAR system 154 can provide improved levels of object identification and decision-making, allowing an autonomous system in a vehicle to decide, for example, whether the driver is drifting into the next lane or is deliberately moving over. The need for this information has driven large increases in the number of automobiles built with one or more radar systems. For example, autonomous driving systems such as blind-spot detection, lane-change assist, front/rear cross-traffic alert, autonomous emergency braking, and adaptive cruise control may rely on data from the RADAR system 154.

The RADAR system 154 generally utilizes frequencies in the 24 GHz band in both the narrow band and ultra-wide band unregulated spectrums. However, new spectrum regulations have curtailed the use of the 24 GHz band so some systems may now utilize frequencies in the 77-81 GHz band. Although, these bands are typically used in automotive RADAR systems, the scope of the systems and methods described herein are not limited to these frequency ranges. In general, the RADAR system 154 emits a high-energy ping and measures the time it takes to receive a reflection. However, some systems implement a frequency-modulated continuous wave that transmits a "chirp" that is a frequency sweep across the bandwidth of the system. Objects in the path of the signal then reflect this chirp back. The difference between the frequency of the chirp coming out of the transmitter and the frequency of the received reflected signal, at any one time, is linearly related to the distance from the transmitter to the object.

Localization of a vehicle using the RADAR system 154 depends, in part, on the resolution and accuracy of this distance measurement. The resolution determines how far apart objects need to be before they are distinguishable as two objects. The accuracy is just that: the accuracy of the distance measurement. The error in the distance measurement and the minimum resolvable distance are inversely proportional to the bandwidth of the chirp. Due to the width of available frequencies, for example, the move from 24 GHz to 77 GHz may achieve $20x$ better performance in range resolution and accuracy. The range resolution of a 77 GHz system can be 4 cm versus 75 cm for 24 GHz radar, which may allow for better detection of multiple objects that are close together.

Although FIG. 1 depicts a RADAR system 154, some systems 100 described herein may not include a RADAR system 154. Alternatively, a system 100 may include multiple RADAR systems 154 positioned at various locations on the vehicle to detect objects within the environment of the vehicle in various fields of view. Additionally, it should be understood that references herein to "sensors" may refer to any one of the aforementioned sensors, the one or more cameras 140, the GPS system 150, the LIDAR system 152, the RADAR system 154, or any other sensor known to those in the art for implementing an autonomous driving system.

Still referring to FIG. 1, the system 100 may include network interface hardware 160 coupled to the communication path 120 and communicatively coupled to the computing device 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles and/or other computing devices via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the system 100 with the nearby vehicles. The nearby vehicles may include network interface hardware 160 and a computing device 130 having a processor 132 and non-transitory computer readable memory 134 capable of being communicatively coupled with the system 100. A processor 132 of the nearby vehicles may execute a machine-readable instruction set stored in the non-transitory computer readable memory 134 to communicate with the system 100.

Figure 2:
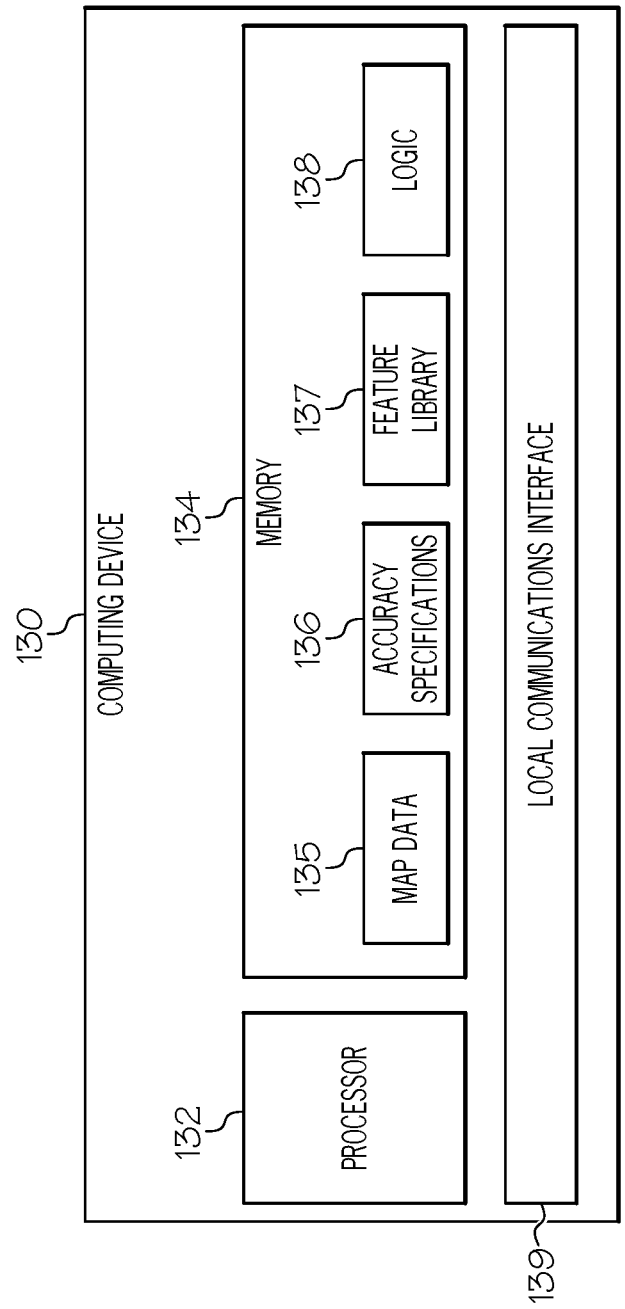
FIG. 2 schematically depicts various elements of a computing device of the system of FIG. 1 according to one or more embodiments shown and described herein.

Referring now to FIG. 2, elements of the computing device 130 are depicted. As illustrated, the computing device 130 includes a processor 132 and non-transitory computer readable memory 134. Additionally, the processor 132 and the non-transitory computer readable memory 134 communicate over a local communications interface 139 within the computing device 130. In some embodiments, the computing device 130 may include additional elements not illustrated in FIG. 2, for example, without limitation, input/output hardware, network interface hardware, and/or other data storage components. The non-transitory computer readable memory 134 may store map data 135, accuracy specifications 136, a feature library 137, and logic 138. The map data 135 may include one or more sets of map data 135. Map data 135 may be a compilation of feature-based maps and/or point cloud data of an environment, for example, a city, town, state, country, or a portion of a road, or a region of a country. The map data 135 may include data representations of environments where a vehicle 110 may travel. For example, one particular map data 135 may include maps of roads for a particular city. The maps may include features that may be detectable by one or more sensors equipped on the vehicle 110. An analysis of data from one or more sensors on the vehicle 110 and a comparison to features within the map data 135 may be used to localize a vehicle 110 in the environment.

The non-transitory computer readable memory 134 may also include accuracy specifications 136. The accuracy specifications 136 define the features to include within a specific map data 135 for a particular type of road and/or driving action, which may be required by the system to localize the vehicle in the environment. For example, an accuracy specification 136 may determine that the map data 135 for a type of road, for example, a highway, include the lane lines and sign features to sufficiently localize a vehicle 110 traversing a highway. That is, features such as vegetation, building, and curbs may not be necessary to identify with the sensors in order to localize a vehicle traveling on a highway. Accordingly, the non-transitory computer readable memory 134 may include a feature library, which defines one or more classes of features. The feature library 137 may include definitions of features so that they may be semantically segmented from sensor data and labeled in the map data to localize the vehicle 110. For example, the feature library may include definitions for features such as but not limited to, signs, lane lines, buildings, signals and stop lines, parking spaces, curbs and barriers, vegetation, street markings (e.g., crosswalks, railroad crossings, or turn arrows), or the like.

Additionally, the non-transitory computer readable memory 134 may include logic 138, which, when executed, causes the processor 132 of the computing device or other components of the system 100 to perform steps of the methods described herein. For example, the non-transitory computer readable memory 134 may include one or more machine-readable instruction sets for preforming the methods, which are described in more detail herein.

The following sections will now describe embodiments of the operation of the system 100 for localizing a vehicle 110 in an environment. In some embodiments of the system 100, the system 100 comprises the computing device 130 having the processor 132 and the non-transitory computer readable memory 134, the one or more cameras 140, the GPS system 150, the LIDAR system 152, and the RADAR system 154 communicatively coupled to the computing device 130. In some embodiments, the system 100 includes additional sensors and systems as described herein.

Figure 3:
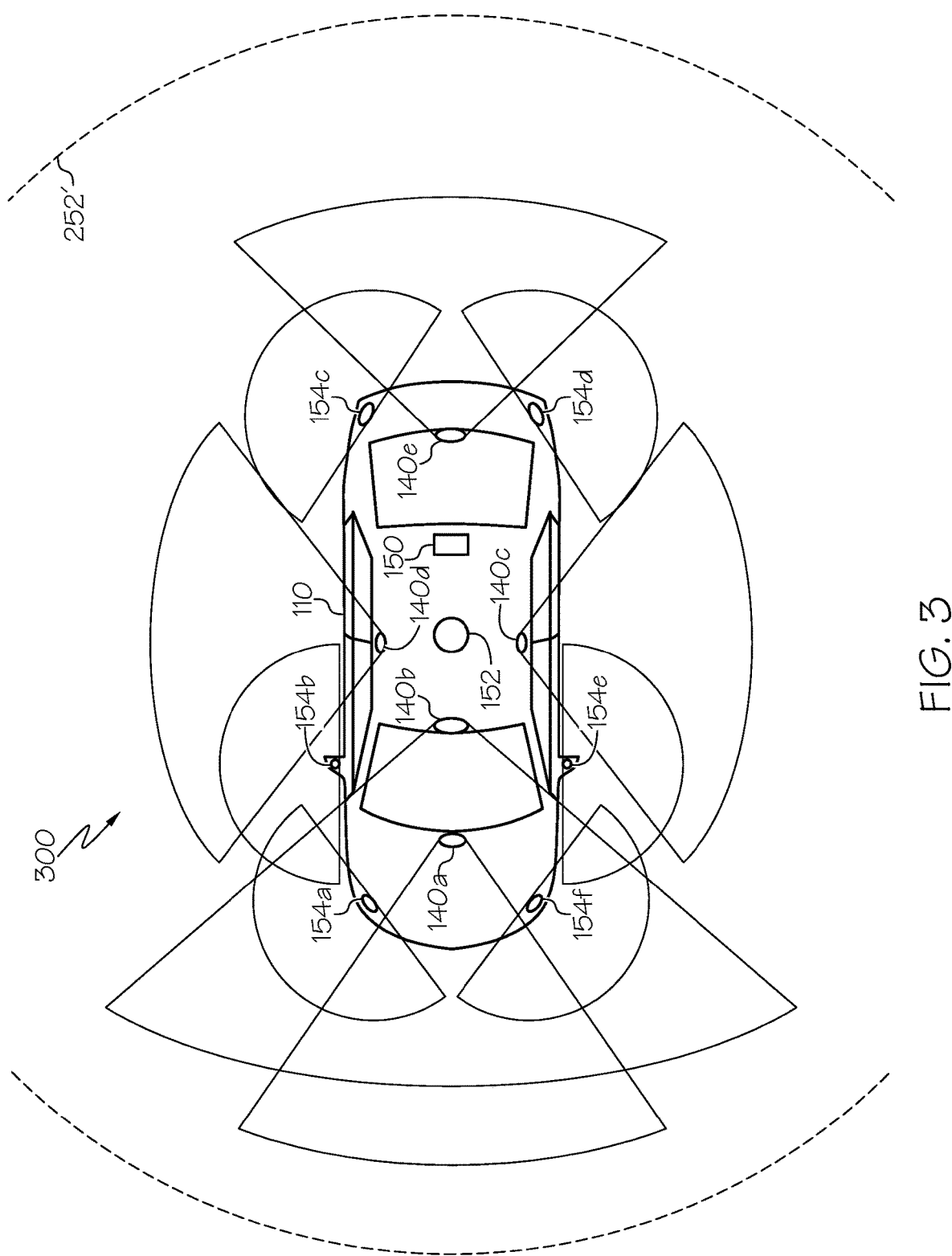
FIG. 3 is a top-down view of a vehicle having sensors for sensing the environment around the vehicle according to one or more embodiments shown and described herein.

Referring now to FIG. 3, a top-down view of the vehicle 110 equipped with multiple sensors is illustrated. The vehicle 110 is an example embodiment of a vehicle 110 having sensors from the system 100. The vehicle 110 includes cameras 140a, 140b, 140c, 140d, and 140e (each of which is one of the one or more cameras 140), each depicted with an example field-of-view. The vehicle 110 includes a GPS system 150 and a LIDAR system 152 positioned on the roof of the vehicle 110. By positioning the LIDAR system 152 on the roof of the vehicle 110, as depicted for example in FIG. 3, the LIDAR system 152 may have a field-of-view 252' of the environment around the vehicle 110 of up to 360-degrees. However, in some embodiments, one or more LIDAR systems 152 may be positioned at various locations on the vehicle 110 to capture different perspectives of the environment. Furthermore, the vehicle 110 includes a RADAR system with RADAR sensors 154a, 154b, 154c, 154d, 154e, and 154f (each of which is part of the RADAR system 154) positioned at various locations on the vehicle 110. The RADAR sensors 154a-154f are also depicted with a field-of-view to depict example detection regions for each RADAR sensor 154a-154f However, in some embodiments, the vehicle 110 may not include a RADAR system.

As illustrated in FIG. 3, the example deployment of sensors on the vehicle 110 includes many of the sensors having overlapping fields-of-view. As such, in some embodiments, an autonomous driving system may receive more than one signal from more than one sensor for the same region of the environment around the vehicle 110. In some instances, the redundancy of data and signals from more than one sensor covering the same region of an environment does not improve the accuracy of autonomous driving system or may not be necessary for certain driving actions and/or the traversal of certain types of roads. In fact, analysis of the data from the sensors covering the same region may increase the computational load required by the system 100 to localize the vehicle 110 in the environment. To address this computational load, the system 100, through an accuracy specification 136, may curtail the data from the one or more of the sensors or the system 100 may not use data from one or more sensors in determining the localization of a vehicle 110 in the environment.

Figure 4:
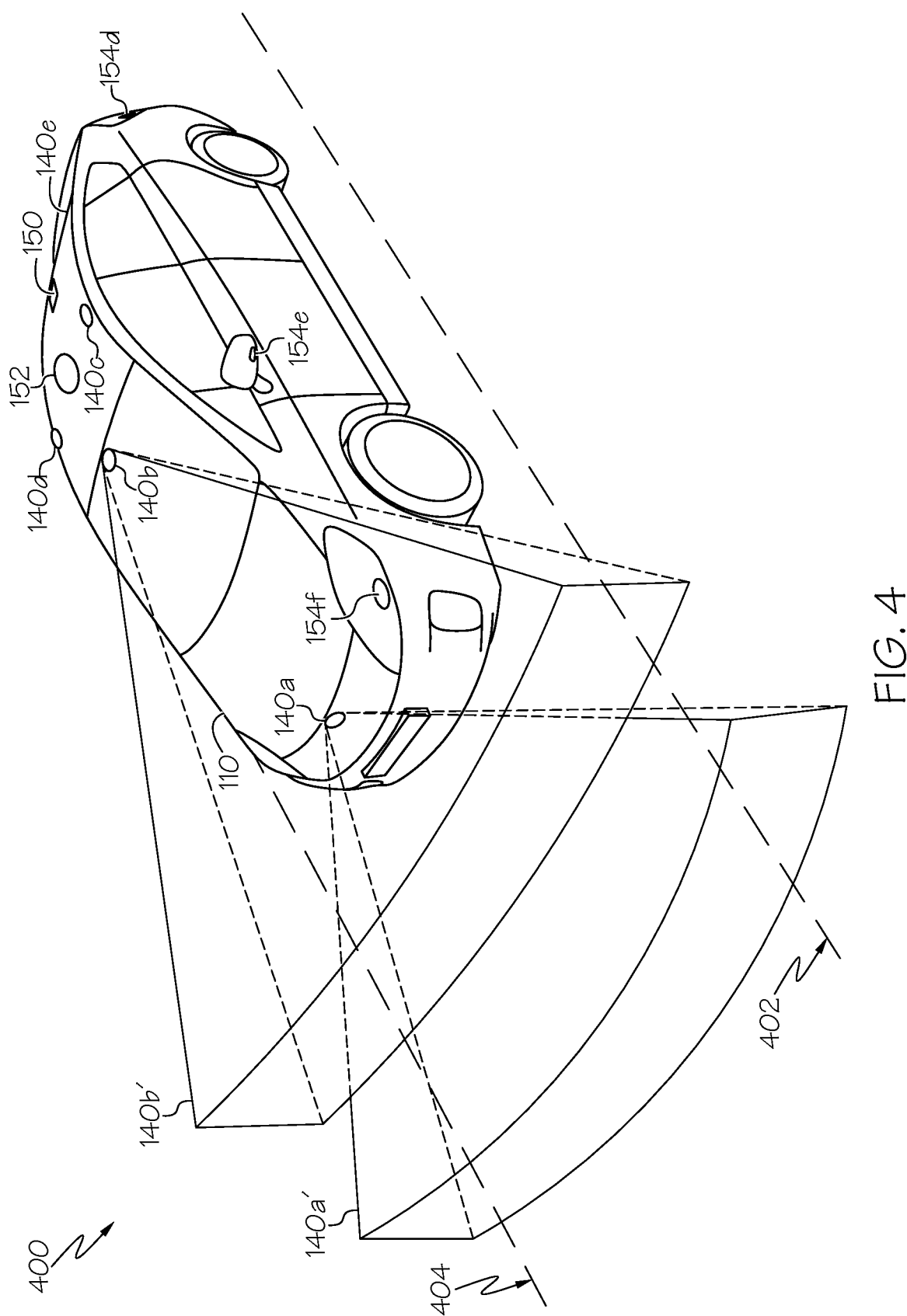
FIG. 4 is a view illustrating a vehicle equipped with sensors for sensing the environment around the vehicle according to one or more embodiments shown and described herein.

Turning to FIG. 4, an example embodiment where the system 100 curtails the number of sensors used for localizing the vehicle 110 in an environment is depicted. The vehicle 110, for example, is depicted traversing a road. For example, the road may be a highway where the vehicle 110 plans to travel in same lane. As a result, localization of the vehicle 110 may be determined based upon lane line features captured by a camera 140a having a field-of-view 140a' of the highway in front of the vehicle 110 that includes image data of the lane lines 402 and 404. Accordingly, although camera 140b also includes a field-of-view 140b' in front of the vehicle 110 the image data from camera 140b may not include the lane lines 402 and 404, therefore may not be needed to localize the lateral position and movement of the vehicle 110. An accuracy specification 136 may define which features in an environment are necessary to localize a vehicle traveling along a highway. For example, since localization of a vehicle 110 traveling along a highway requires a high degree of accuracy with respect to lateral position and movement (i.e., keeping to a specific lane on the highway) and less of a degree of accuracy with respect to longitudinal position and movement (e.g., how far the vehicle has traveled along the highway), then the accuracy specification 136 may be defined to reduce or eliminate dependency on the sensors which provide signals and data for localizing the longitudinal position and movement of the vehicle 110. For example, it may only be necessary to receive and/or analyze image data from the camera 140a to localize the vehicle 110 traversing the highway. In some embodiments, data from the GPS system 150 may be sufficient to provide the localization of the longitudinal position and movement of the vehicle 110 until a high degree of accuracy for localization of the vehicle 110 in the longitudinal position is necessary.

While FIG. 4 and the above example depict and describe an embodiment where the vehicle 110 traverses a highway, it should be understood that other types of roads and/or driving actions may have an accuracy specification 136 defined to reduce the dependency on one or more sensors and the related signals and data provided by those sensors to localize a vehicle 110 in an environment.

In some embodiments, the system 100 may reduce the computational load used to localize a vehicle by creating or adjusting map data 135 to have a reduced number of features based on an accuracy specification 136. The accuracy specification 136 determines which features in the map data are necessary to localize the vehicle travelling on a particular type of road and/or during a particular driving action, such as locating an exit ramp and exiting a highway. For example, a sensor may detect a sign and provide the computing device 130 with a signal and data indicating the detection of the sign, but if the map data currently utilized by the computing device to localize the vehicle does not include sign features then the sign may be ignored as irrelevant to the process of localization. As such, the computational resources that may have been used to identify the sign in the map data and update the localization of the vehicle based on the detection of the sign may be preserved for other processes.

Figure 5:
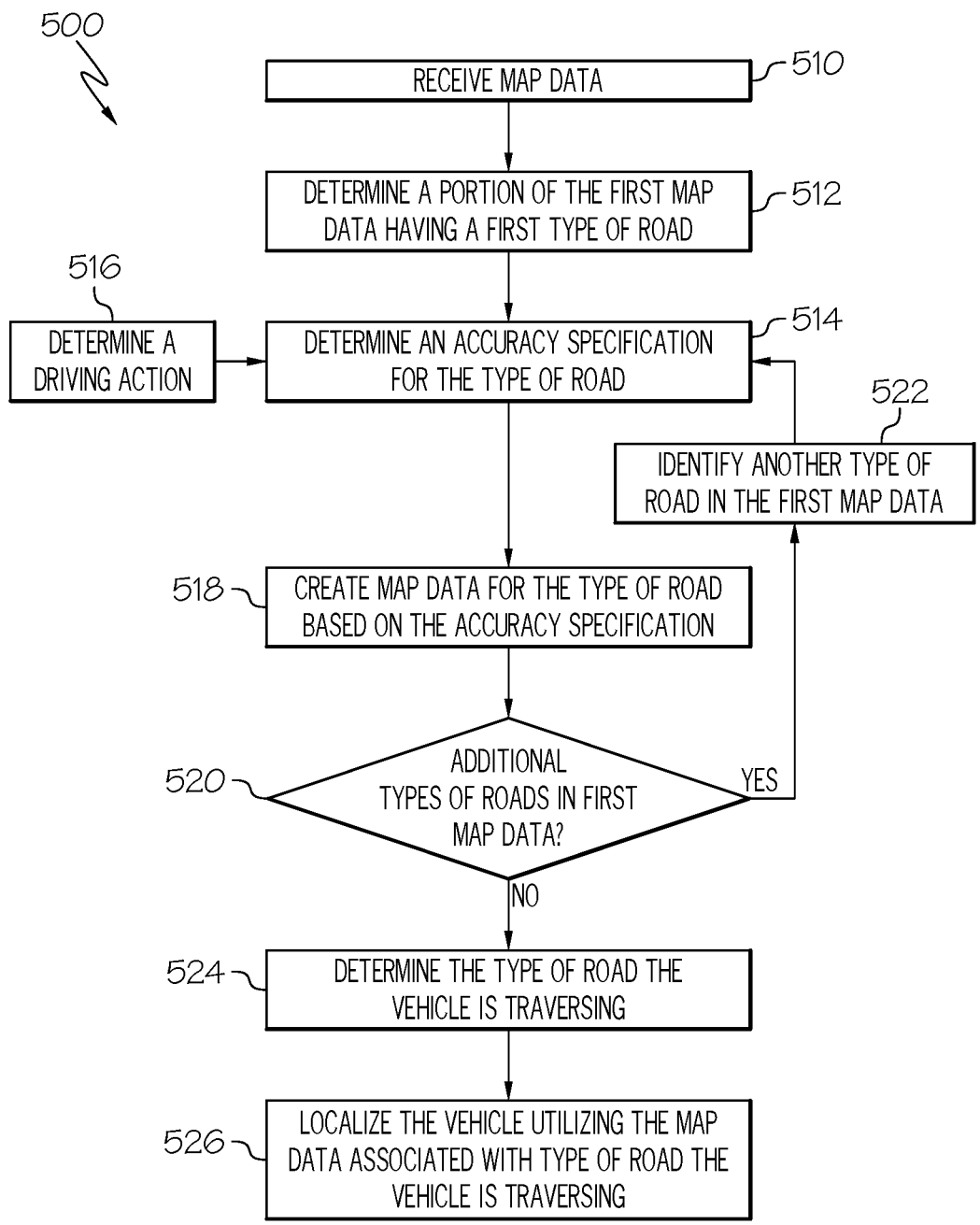
FIG. 5 is a flow diagram illustrating a method of localizing a vehicle using an accuracy specification according to one or more embodiments shown and described herein.

Turning now to FIG. 5, a flow diagram 500 illustrating a method of localizing a vehicle using an accuracy specification is depicted. The flow diagram 500 depicted in FIG. 5 is a representation of a machine-readable instruction set stored in the non-transitory computer readable memory 134 and executed by the processor 132 of the computing device 130. The process of the flow diagram 500 in FIG. 5 may be executed at various times and/or in response to determining the vehicle is traversing a particular type of road.

In step 510, the computing device 130 receives map data. The computing device 130 may receive map data from various sources. In some embodiments, the map data 135 may be stored in the non-transitory computer readable memory 134 and accessed by the system 100. In some embodiments, the map data 135 may be generated by the one or more sensors coupled to the vehicle or may be transmitted from a remote computing device via the network 170 to the computing device 130. Once the map data is received, in step 512, the computing device 130 may determine a portion of the first map data having a first type of road. The first map data may be a comprehensive feature-based set of maps. The first map data may be compiled using a point cloud representation of the environment, an image based representation of the environment, or a combination of the two to define one or more features within the environment.

In step 514, an accuracy specification is determined. The accuracy specification may define one or more features necessary to localize a vehicle in an environment having the first type of road. In some embodiments, the first type of road may be a highway, a city street, a parking lot, a country road, or any other type of road a vehicle may traverse. The one or more features within the map data may include signs, lane lines, buildings, signals and stop lines, parking spaces, curbs and barriers, vegetation, street level markings (e.g., crosswalks, railroad crossings, or turn arrows), or the like. Signs may include anything posted along a road indicating information to the vehicle or driver. For example, a sign may include a stop sign, a mile marker, a street sign, a highway billboard, or the like. The accuracy specification may be defined by a user who inputs the details for the specification into the memory of the computing device 130. However, in some embodiments, the accuracy specification may be developed from heuristics obtained through driving events along a type of road. In some embodiments, for example, in step 516, the computing device 130 may further determine an accuracy specification to correspond to learned or upcoming driving actions associated with particular types of roads. For example, if a driver is prone to make turns along a specific type of road the accuracy specification may include features to improve the accuracy of localization should a driver determine to make a turn.

As another example, in a fully autonomous vehicle a route guidance may be entered, which includes a starting location and a destination. Based on the map data, the computing device 130 may determine a route and then one or more accuracy specifications for portions of the route may be determined based on one or more driving actions (e.g., vehicle maneuvers required to traverse a portion of the route) and the one or more types of roads the vehicle will traverse during the route. In other embodiments, where the route may not be known, the driving actions to associate with the accuracy specification for a type of road may be determined based on commonly executed vehicle maneuvers associated with that type of road or even from past driving history. For example, the computing device 130 may determine the current route is a route to work from home, and then the computing device 130 may predict driving actions that will occur along the route and update or generate accuracy specifications in response.

In step 518, the computing device 130 creates a new map data (e.g., a second map data) or updates the portion of the first map data having the first type of road based on the accuracy specification. For example, the second map data includes the one or more features defined by the accuracy specification for the first type of road. In step 520, the computing device 130 determines whether there are additional types of roads in the first map data. For example, if there are additional portions of the first map data having another type of road that may be refined to reduce the computational load in localizing a vehicle traversing that type of road then the computing device 130, in step 522, identifies the next type of road and subsequently determines an accuracy specification, in step 514, for that type of road. However, if there are no additional types of roads that may be refined to reduce the computational load in localizing the vehicle traversing that type of road, then the process continues to step 524. Although, in some embodiments, the process may end until the vehicle actively begins to utilize the map data for localization. In step 524, the computing device 130 may determine the type of road the vehicle is traversing. For example, the computing device 130 determines when the vehicle transitions from one type of road to another type of road, such as a highway to an exit ramp to a city street. For each type of road the vehicle traverses, the computing device 130 may select and utilize the map data corresponding to that type of road to localize the vehicle, in step 526. As a result, the computing device 130 may reduce the computational load in localizing the vehicle since the map data for the specified type of road may include a reduced or more refined set of features specific to localizing the vehicle along that type of road.

Figure 6:
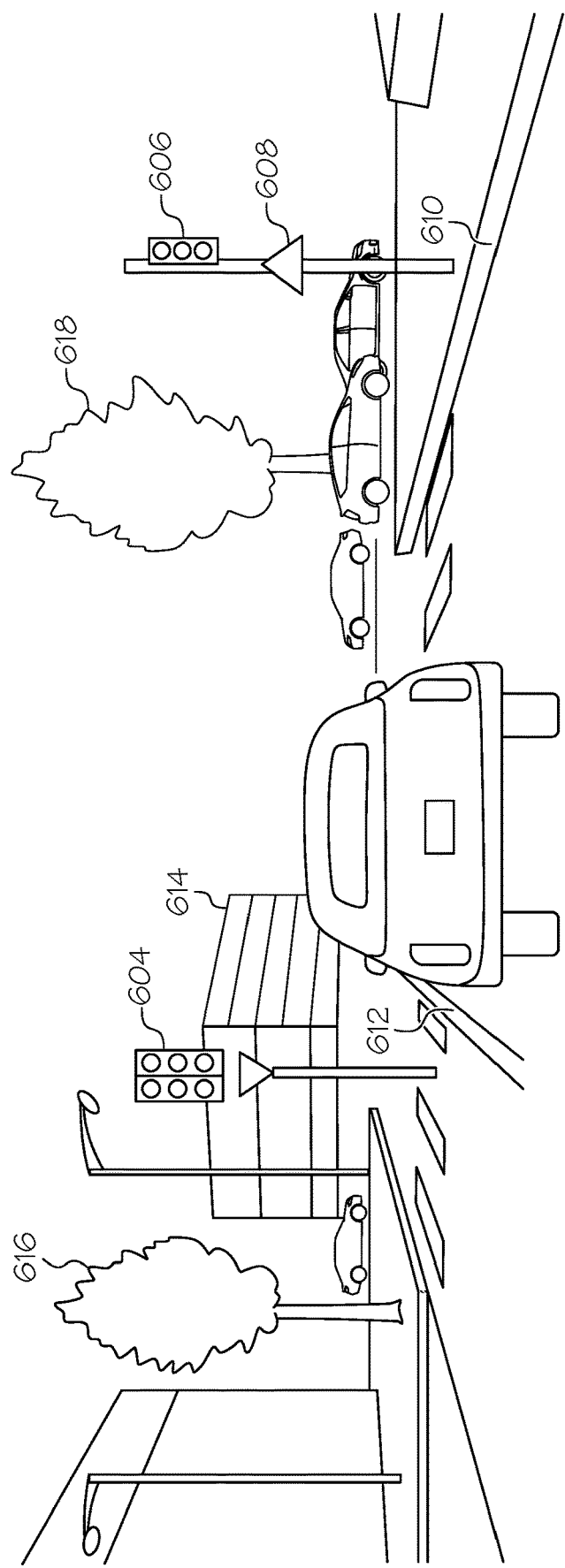
FIG. 6 depicts an example environment of a city street generated by the sensors on the vehicle according to one or more embodiments shown and described herein.

By way of example and with reference to FIG. 6, a computing device 130 may utilize a first map data for a vehicle that is traversing a city street. FIG. 6 depicts an example of the image data captured by the one or more cameras 140 on the vehicle 110 with features defined in the first map data. The first map data may include numerous features for localizing the vehicle since lateral and longitudinal positions and movements within a city need to be determined with a high degree of accuracy. For example, the accuracy specification for a city street type of road may include features such as signs 608, lane lines 612, buildings 614, signals and stop lines 604 and 606, parking spaces (not depicted), curbs and barriers 610, vegetation 616 and 618 and street level markings (e.g., crosswalks, turn arrows, and the like). However, features such as vegetation 616 and 618 may not be necessary since environments along city streets may not include much vegetation 616 and 618 or the vegetation 616 and 618 may not be unique enough to facilitate localization of a vehicle on a city street based on vegetation 616 and 618 such as trees and bushes.

In some embodiments, while the vehicle 110 traverses the city street, for example, the one depicted in FIG. 6, the system 100 may capture image data from the one or more cameras 140. The system, using the first map data, may further identify features in the image data. The identification of the features may be used to localize the vehicle 110 in the environment. To reduce the consumption of computational resources, the system 100 may not identify or associate features such as vegetation 616 and 618 if the first map data does not include a definition for that feature.

Figure 7:
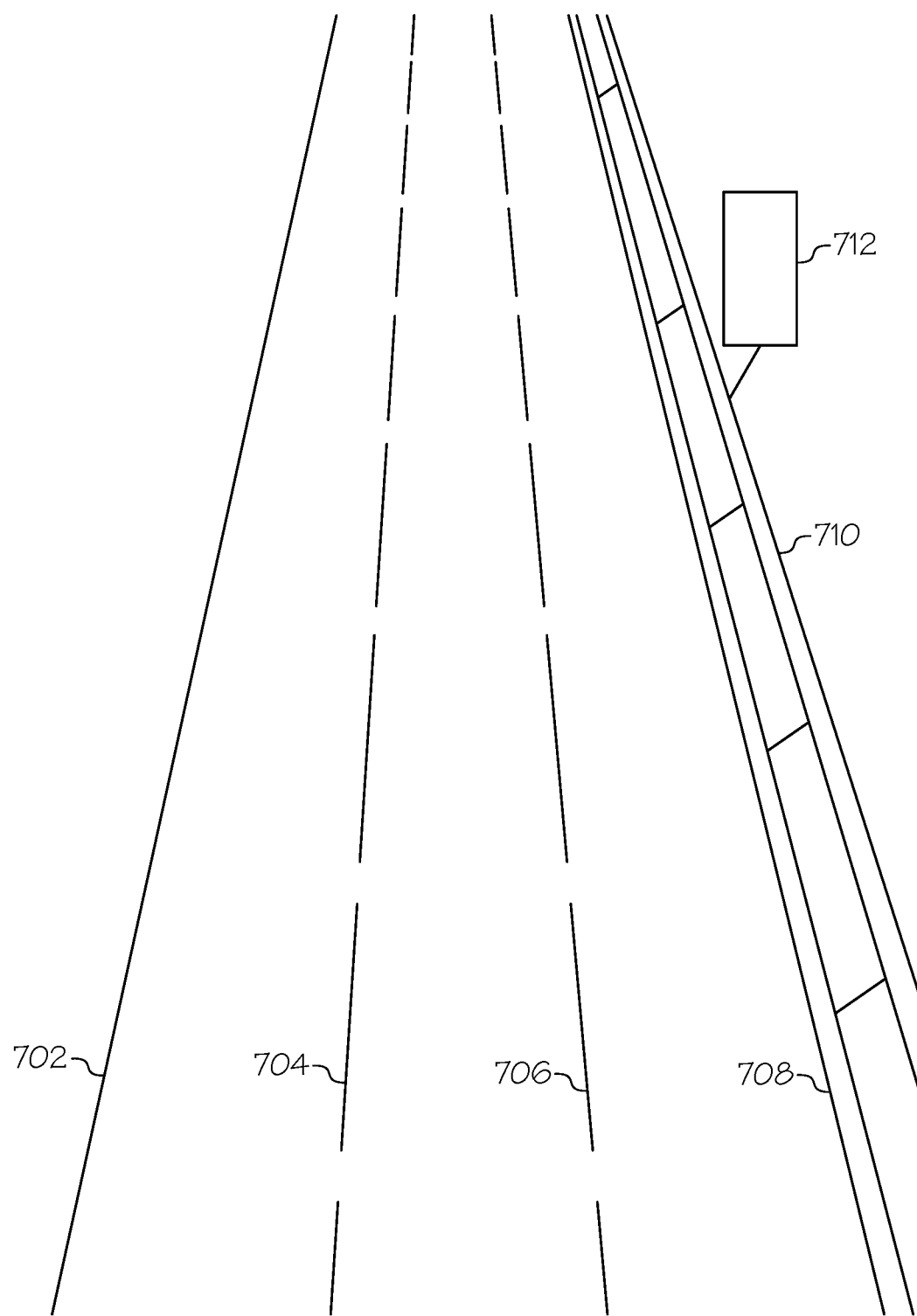
FIG. 7 depicts an example environment of a highway generated by the sensors on the vehicle according to one or more embodiments shown and described herein.

However, as the vehicle leaves the city streets and enters for example a highway, the computing device 130 transitions the system 100 from reliance on a first map data to a second map data that is defined by another accuracy specification for localizing a vehicle along a highway. FIG. 7 depicts an example of the image data captured by the one or more cameras 140 on the vehicle 110 with features defined in the second map data. The second map data may include fewer features than the first map data for localizing the vehicle since the degree of accuracy for longitudinal positions and movements may decrease. For example, the accuracy specification defining the second map data for a highway type of road may only include features such as lane lines 702, 704, 706, and 708, curbs and barriers 710, and mile-marker signs 712. That is, some features may no longer be relevant to localizing a vehicle on a highway, for example, buildings. Although they may be captured by sensors on the vehicle 110, they may not provide relevant information for localizing a vehicle traversing a highway. So, rather than expending computational resources computing a localization of a vehicle that incorporates detection of a building by one of the sensors and associated it with the map data, the accuracy specification may state that buildings are to be excluded from the second map data.

In some embodiments, while the vehicle 110 traverses a highway, for example, the one depicted in FIG. 7, the system 100 may capture image data from the one or more cameras 140. The system, using the second map data, may further identify features in the image data. The identification of the features may be used to localize the vehicle 110 in the environment. To reduce the consumption of computational resources, the system 100 may not identify or associate features such as buildings, signals and stop lines, parking spaces, vegetation and street level markings if the second map data does not include a definition for the feature.

In some embodiments, the system 100 may continue to define new types of roads and accuracy specifications for the types of roads the vehicle traverses throughout a driving event. Additionally, the system 100 transitions between reliance on the one or more various map data defined by the one or more accuracy specifications as the vehicle travels from one type of road to another.

It should now be understood that embodiments described herein are directed to systems and methods for localizing a vehicle based on map data defined by an accuracy specification. The accuracy specification defines the map data for a particular type of road based on the degree of accuracy and the sensors required to localize a vehicle traversing that type of road. As a result, when a high degree of accuracy or a particular sensor system will not enhance or be utilized in the localization of the vehicle the accuracy specification will reduce or remove reliance on that element thereby reducing the computation resources required for the localization.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for localizing a vehicle in an environment comprising:
a computing device comprising a processor and a non-transitory computer readable memory; and
a first map data stored in the non-transitory computer readable memory, wherein the first map data defines a plurality of features within an environment used to localize a vehicle within the environment, the computing device configured to:
determine a portion of the first map data having a first type of road,
determine a first accuracy specification for the first type of road by identifying one or more features of the plurality of features defined in the first map data used to localize the vehicle traversing the first type of road within a predefined degree of accuracy, the predefined degree of accuracy defines a reduced degree of accuracy for localizing the vehicle using the one or more features identified by the first accuracy specification,
create a second map data for the first type of road, wherein the second map data comprises the one or more features defined by the first accuracy specification, and the second map data includes fewer features to localize the vehicle than the first map data, and
localize the vehicle utilizing the second map data, wherein localizing the vehicle using the second map data reduces a computational load of the computing device in localizing the vehicle compared to localizing the vehicle using the first map data.

2. The system of claim 1, wherein the computing device is further configured to:
determine whether the vehicle is traversing the first type of road, and
localize the vehicle utilizing the second map data when the vehicle traverses the first type of road.

3. The system of claim 1, wherein the computing device is further configured to:
determine a second type of road within the first map data, wherein the second type of road is different than the first type of road,
determine a second accuracy specification for the second type of road, wherein the second accuracy specification defines one or more features of the plurality of features defined in the first map data used to localize the vehicle traversing the second type of road, and
create a third map data for the second type of road, wherein the third map data comprises the one or more features defined by the second accuracy specification.

4. The system of claim 3, wherein the second map data comprises at least one feature that is different than the one or more features included in the third map data.

5. The system of claim 3, wherein the computing device is further configured to:
determine whether the vehicle is traversing the first type of road or the second type of road,
localize the vehicle using the first map data when the vehicle is deemed to be traversing the first type of road, and
localize the vehicle using the second map data when the vehicle is deemed to be traversing the second type of road.

6. The system of claim 1, wherein the first map data comprises a point cloud representation of the environment.

7. The system of claim 1, wherein the first map data comprises an image based representation of the environment.

8. The system of claim 1, wherein the first map data comprises a point cloud representation and an image based representation of the environment.

9. The system of claim 1, wherein the first accuracy specification is based on the first type of road and one or more driving actions.

10. The system of claim 1, wherein the first type of road comprises a city street.

11. The system of claim 1, wherein the first type of road comprises a highway.

12. The system of claim 1, wherein the plurality of features within the environment includes at least one class of feature selected from the group comprising:
   signs,
   lane lines,
   buildings,
   signals and stop lines,
   parking spaces,
   curbs and barriers, and
   vegetation.

13. A system for localizing a vehicle in an environment comprising:
   a computing device comprising a processor and a non-transitory computer readable memory;
   a first map data stored in the non-transitory computer readable memory, wherein the first map data comprises one or more features defined by a first accuracy specification for localizing a vehicle traversing a first type of road; and
   a second map data stored in the non-transitory computer readable memory, wherein the second map data is created from one or more features determined by a second accuracy specification for localizing the vehicle traversing a second type of road within a predefined degree of accuracy, the predefined degree of accuracy defines a reduced degree of accuracy for localizing the vehicle using the one or more features identified by the second accuracy specification, and the second type of road is different from the first type of road, wherein the computing device is configured to:
      determine whether the vehicle is traversing the first type of road or the second type of road,
      localize the vehicle using the first map data when the vehicle is deemed to be traversing the first type of road, and
      localize the vehicle using the second map data when the vehicle is deemed to be traversing the second type of road, wherein localizing the vehicle using the second map data reduces a computational load of the computing device in localizing the vehicle compared to localizing the vehicle using the first map data.

14. The system of claim 13, wherein the one or more features defining the first map data includes at least one feature that is different than the one or more features defining the second map data.

15. The system of claim 13, wherein the first type of road is a city road and the second type of road is a highway.

16. The system of claim 13, wherein the one or more features of the first accuracy specification includes signs, lane lines, signals and stop lines to localize the vehicle traversing the first type of road, and
   the one or more features of the second accuracy specification includes lane lines to localize the vehicle traversing the second type of road.

17. The system of claim 13, wherein the first map data and the second map data include at least one feature selected from the group comprising:
   signs,
   lane lines,
   buildings,
   signals and stop lines,
   parking spaces,
   curbs and barriers, and
   vegetation.

18. A method of localizing a vehicle in an environment comprising:
   determining a portion of a first map data having a first type of road;
   determining a first accuracy specification for the first type of road by identifying one or more features for localizing a vehicle traversing the first type of road within a predefined degree of accuracy, the predefined degree of accuracy defines a reduced degree of accuracy for localizing the vehicle using the one or more features identified by the first accuracy specification;
   creating a second map data for the first type of road, wherein the second map data comprises the one or more features defined by the first accuracy specification;
   determining whether the vehicle is traversing the first type of road; and
   localizing the vehicle utilizing the second map data when the vehicle is deemed to be traversing the first type of road, wherein localizing the vehicle using the second map data reduces a computational load of a computing device in localizing the vehicle compared to localizing the vehicle using the first map data.

19. The method of claim 18, further comprising:
   determining a second type of road within the first map data, wherein the second type of road is different than the first type of road;
   determining a second accuracy specification for the second type of road, wherein the second accuracy specification identifies one or more features for localizing the vehicle traversing the second type of road; and
   creating a third map data for the second type of road, wherein the third map data comprises the one or more features defined by the second accuracy specification.

20. The method of claim 19, further comprising:
   determining whether the vehicle is traversing the first type of road or the second type of road;
   localizing the vehicle using the second map data when the vehicle is traversing the first type of road; and
   localizing the vehicle using the third map data when the vehicle is deemed to be traversing the second type of road.

21. The system of claim 1, further comprising a plurality of sensors for detecting the plurality of features within the environment used to localize the vehicle, the plurality of sensors communicatively coupled to the computing device, and wherein the first accuracy specification defines a subset of the plurality of sensors for localizing the vehicle within the predefined degree of accuracy.

22. The system of claim 13, further comprising a plurality of sensors for detecting the plurality of features within the environment used to localize the vehicle, the plurality of sensors communicatively coupled to the computing device, and wherein the computing device is further configured to:
   detect the one or more features defined by the first accuracy specification with a first subset of the plurality of sensors defined by the first accuracy specification when localizing the vehicle traversing the first type of road, and detect the one or more features defined by the second accuracy specification with a second subset of the plurality of sensors defined by the second accuracy specification when localizing the vehicle traversing the second type of road.

23. The method of claim 18, further comprising detecting the one or more features defined by the second map data using a subset of a plurality of sensors equipped on the vehicle defined by the first accuracy specification for localizing the vehicle within the predefined degree of accuracy, when localizing the vehicle traversing the first type of road using the second map data.

* * * * *